United States Patent [19]
Gardetto

[11] Patent Number: 5,660,653
[45] Date of Patent: Aug. 26, 1997

[54] RUN-FLAT SUPPORT FOR PNEUMATIC TIRED WHEEL

[76] Inventor: William W. Gardetto, 3511 Brentwood Dr., Bedford, Tex. 76021

[21] Appl. No.: 518,983

[22] Filed: Aug. 24, 1995

[51] Int. Cl.$^6$ ............................................. B60C 17/01
[52] U.S. Cl. .............................. 152/520; 152/381.4
[58] Field of Search ...................... 152/379.4, 381.3, 152/381.4, 381.5, 381.6, 390, 391, 400, 401, 516, 520

[56] References Cited

U.S. PATENT DOCUMENTS

| | | | |
|---|---|---|---|
| 1,170,225 | 2/1916 | Dillmore | 152/391 X |
| 3,828,836 | 8/1974 | Bradley | 152/400 X |
| 4,059,138 | 11/1977 | Mirtain et al. | 152/330 |
| 4,157,107 | 6/1979 | Cataldo | 152/330 |
| 4,169,496 | 10/1979 | Cataldo | 152/379.1 |
| 4,183,388 | 1/1980 | Cassidy | 152/158 |
| 4,202,393 | 5/1980 | Ikeda et al. | 152/330 |
| 4,257,467 | 3/1981 | Van der Burg | 152/158 |
| 4,281,700 | 8/1981 | Ross | 152/158 |
| 4,346,747 | 8/1982 | Osada et al. | 152/158 |
| 4,428,411 | 1/1984 | Markow et al. | 152/330 |
| 4,572,260 | 2/1986 | Ordu | 152/520 X |
| 4,573,509 | 3/1986 | Smith et al. | 152/158 |
| 4,673,014 | 6/1987 | Markow | 152/156 |
| 4,709,738 | 12/1987 | Goodell et al. | 152/400 |
| 4,794,966 | 1/1989 | Markow | 152/516 |
| 4,823,854 | 4/1989 | Payne et al. | 152/382 |
| 4,854,356 | 8/1989 | Koutsoupidis | 152/520 X |
| 5,012,849 | 5/1991 | Ko | 152/520 |

FOREIGN PATENT DOCUMENTS 2204841  11/1988  United Kingdom ............... 152/520

OTHER PUBLICATIONS

"Throw Away the Spare", by Jim McCraw, *Popular Science*, May 1993, pp. 88, 89, 90 and 106.

*Primary Examiner*—Russell D. Stormer
*Attorney, Agent, or Firm*—Dennis T. Griggs

[57] ABSTRACT

A support device for a pneumatic tired wheel for supporting the tire in a deflated or run-flat condition includes circular segment support members, each having a transverse cylindrical web and opposed radially inwardly projecting flange portions. The support member segments are interconnected by linkages which provide for radially extending and retracting the segments so that the support device may be mounted on a fixed or one-piece wheel having a rim portion with a diameter less than the opposed tire bead support flanges and with or without removing a tire entirely from the wheel. Threaded bolts are mounted on the wheel rim and extend radially outwardly into engagement with a link member of each of the linkages to cause the linkages to radially extend or retract the support segments. The segment webs are crowned to aid in centering the tire on the support device during operation thereof and tire gripping surfaces may be formed on the segment webs to minimize lateral or circumferential slippage of the tire relative to the support device.

13 Claims, 8 Drawing Sheets

RUN-FLAT SUPPORT FOR PNEUMATIC TIRED WHEEL

FIELD OF THE INVENTION

The present invention is generally related to pneumatic tires for motor vehicles, and in particular to an internal rim support device for supporting a tire in a deflated and run-flat condition.

BACKGROUND

Pneumatic tired wheels are widely used in virtually all types of land vehicles, including automobiles, trucks, trailers, tractors, other self propelled and unpowered vehicles and aircraft landing gear. The intense development activities involving pneumatic tired wheels and tires has resulted in a highly developed state of the art with respect to tire design, including the development of tubeless tires and so-called radial tires which allow substantial deflection of the tire sidewall during normal operation to improve vehicle handling performance, cushion the vehicle against road imperfections, improve vehicle operating efficiency and lengthen tire life through reduced friction due to tire deflection.

However, a substantial limitation on the performance of pneumatic or gas medium charged tires, is directly caused by the loss of inflation pressure. Various attempts have been made to eliminate loss of charge pressure due to tire wall puncture and provide tire designs which will enable the tire to continue to operate in a deflated or "run-flat" condition. Of course, conventional pneumatic tires, if deflated, cause substantial loss of vehicle control and tire and wheel damage quickly result from any attempt to operate the vehicle.

For example, efforts have been directed at developing tires with sidewall and tread reinforcements and wheel rim configurations which permit tires to operate in the run-flat condition. These efforts have only been partially successful and still result in reduced vehicle stability and control and undesirable changes in tractive effort due to changes in effective wheel diameter and tire deflection. Moreover, run-flat tires have been developed with a view to eliminating the need for a spare tire onboard the vehicle and the problems associated with changing deflated pneumatic tires under on-the-road conditions as well as the desire to eliminate the problems associated with the space required in the vehicle to stow a spare tire and the associated tire changing tools.

Accordingly, considering the problems associated with providing conventional spare tires and tools and the somewhat inadequate solutions provided by self-sealing and prior art run-flat tire designs, efforts also have been directed to providing vehicle wheels with run-flat support devices which may be installed within the wheel-tire pressure chamber or cavity and which support the tire in an under-deflated or run-flat condition.

DESCRIPTION OF THE PRIOR ART

The problems associated with self-sealing tires to minimize pressure loss and efforts to design tires which will operate in a deflated or run-flat condition have run parallel to efforts to develop support devices which may be installed on a pneumatic tired wheel within the tire pressure chamber to support the tire when it is partially or completely deflated without substantially reducing the wheel effective diameter so that vehicle stability and control is not compromised and the vehicle may be operated for an extended period of time with the tire deflated. Devices have been developed which include single and multi-part cushion members which are disposed on the wheel rim between the tire bead flanges and extend radially outward from wheel axis of rotation to support the tire in a deflated condition.

Some of these conventional devices have been fabricated of resilient elastomeric materials of relatively complex construction and may be stretched over the wheel rim to mount on unitary rims. These devices, if stiff enough to support a tire in a run-flat condition, are difficult to mount on one piece rims due to the difference in diameter between the tire bead flanges and the interconnecting rim center portion or web. On other hand, if these devices are resilient enough to be slipped over the bead flanges and engaged with the wheel rim in a static condition, they tend to lose their support position during high wheel speed due to centrifugal forces acting thereon.

Still further, single and multi-part, substantially rigid, annular or toroidal support devices have been developed for mounting on pneumatic tired wheel rims, particularly multi-part rims wherein there is no requirement that the diameter of the support device change during the mounting procedure since it is not necessary to provide for slipping the device over the larger diameter tire bead flange and then be adapted to engage the smaller diameter rim web.

A substantial number of relatively light duty vehicle wheel configurations are characterized by one piece or fixed multi-part wheel structures which cannot be disassembled to provide access to the smaller diameter rim web or center portion for mounting a run-flat support device. Conventional devices for wheel rims for supporting pneumatic tires in a run-flat condition have not been properly adapted for mounting on a rim which has a tire bead flange of a larger diameter than the rim web portion between the bead flanges.

The present invention has been developed for providing a support device for use in combination with a pneumatic tired wheel to permit safe operation of the wheel in a run-flat condition of the tire without significant loss of vehicle stability or control, while providing for adequate tractive effort of the wheel with the tire in the run-flat condition and to substantially reduce the chance of tire destruction or damage while being operated in the under-inflated or run-flat condition for extended periods.

SUMMARY OF THE INVENTION

The present invention provides a unique support device for a pneumatic tired wheel for supporting a pneumatic tire in an under-deflated, deflated or run-flat condition.

The present invention also provides a support device for a pneumatic tired wheel for supporting a tire in a run-flat condition which is particularly adapted for installation on a substantially one piece or fixed wheel having a circular rim or web portion interposed between opposed tire bead flanges which is of a diameter less than the diameter of the bead flanges.

In accordance with one aspect of the present invention, a substantially rigid support device is provided for mounting on a pneumatic tired wheel and adapted to be supported between flanges of the wheel which support the circular pneumatic tire beads, which can be mounted on and removed from the wheel with or without a tire disposed at least partially thereon. The support device includes multiple circular segment support members having opposed flanges and a connecting web for engagement with the tire tread inner wall to support the tire in an under-inflated, deflated, or partially reduced diameter operating condition which will provide suitable vehicle stability and control and suitable tractive effort.

The present invention further provides a multi-part circular segment support device for mounting on a pneumatic tired vehicle wheel which includes a unique linkage interconnecting plural support member segments of the support device for movement of the segments between a position for mounting or demounting the support device with respect to the wheel and a working position on the wheel. Still further, the invention contemplates the provision of a run-flat tire support device which may be mounted on various types of existing one piece, fixed or multi-part wheel rims and suitably secured thereto by a unique coupling and linkage structure which supports plural circular segment support members of the support device firmly fixed to the wheel rim under all operating conditions.

The run-flat support device of the present invention also provides an assembly which may be easily secured to a conventional vehicle wheel rim without completely removing the tire from the wheel and the support device itself is substantially preassembled prior to mounting on the wheel. The support device of the invention overcomes several disadvantages of prior art support devices and may be used with single piece and fixed flange wheels as well as multi-piece wheels.

The foregoing features and advantages of the run-flat tire support device of the present invention will be understood by those skilled in the art upon reading the detailed description which follows with reference to the drawings, wherein:

DETAILED DESCRIPTION OF THE PREFERRED EMBODIMENTS

Figure 1:
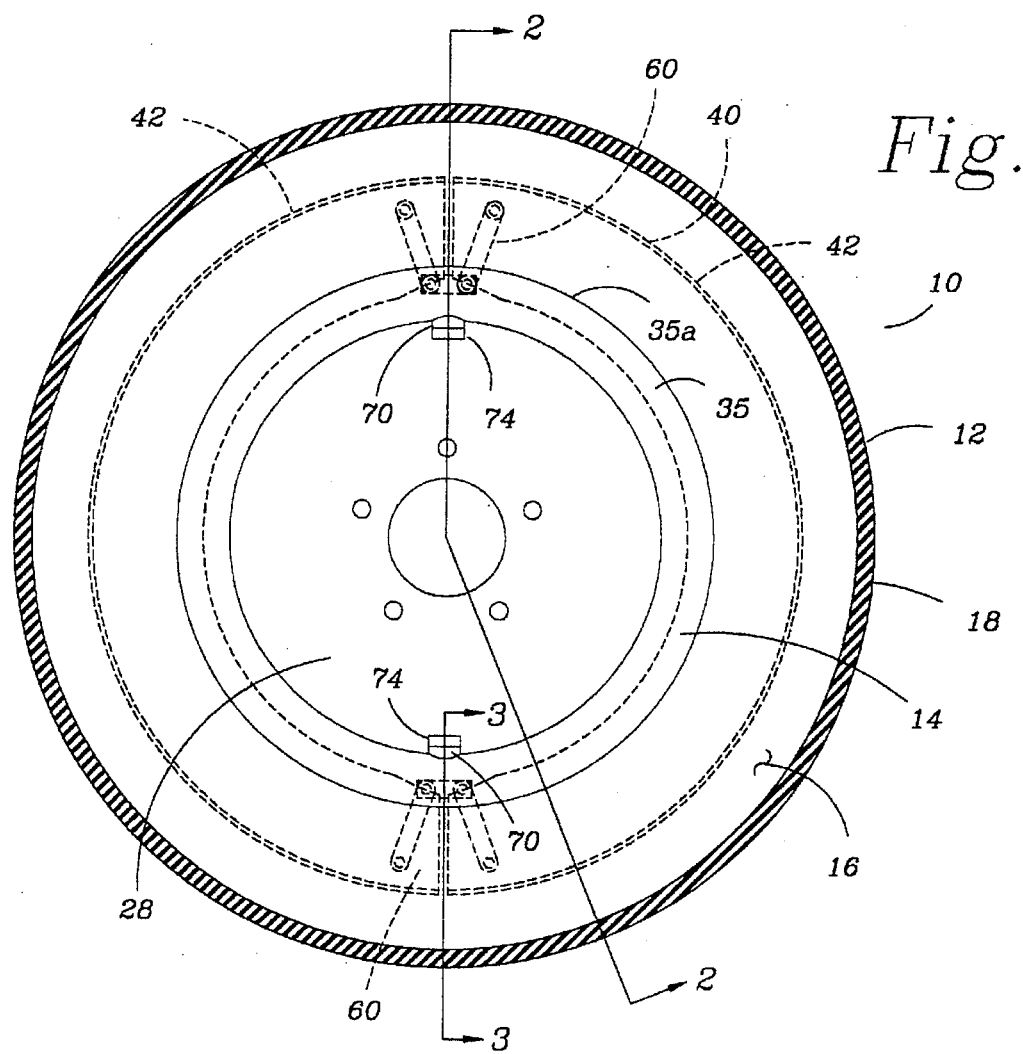
FIG. 1 is a side elevation view of a pneumatic tired wheel including the unique support device of the invention disposed thereon.

In the description which follows like parts are marked throughout the specification and drawing with the same reference numerals, respectively. The drawing figures are not necessarily to scale in the interest of clarity and conciseness.

Figure 2:
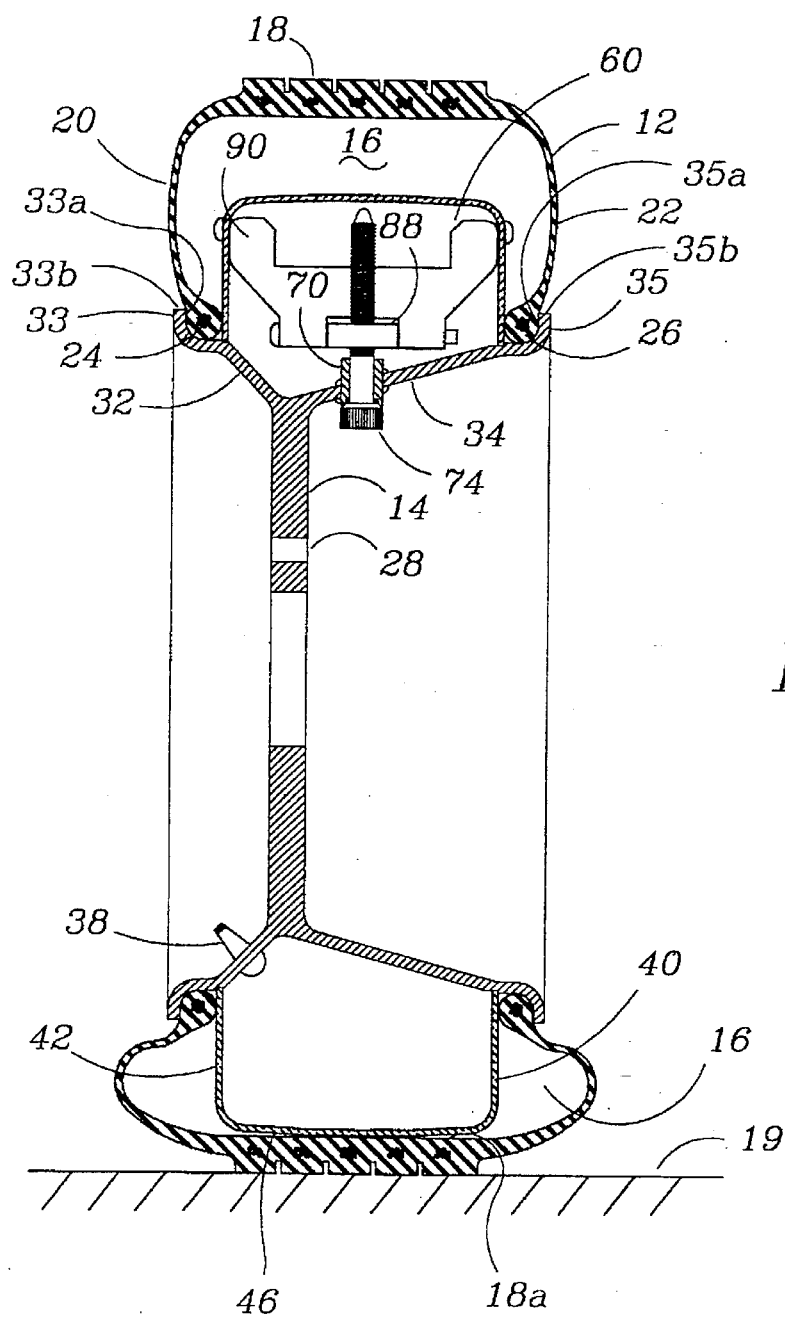
FIG. 2 is a section view taken generally from the line 2—2 of FIG. 1.

Referring to FIGS. 1 and 2, there is shown a conventional pneumatic tired wheel assembly, generally designated by the numeral 10, which has been modified to include the unique run-flat tire support device of the present invention. The wheel assembly 10 includes a conventional pneumatic tire 12 supported on a substantially rigid wheel 14 and forming an annular inflation space or chamber 16. In FIG. 2 the tire 12 is shown in a condition wherein the gas pressure in the inflation chamber 16 is reduced enough to cause the tire to operate in the run-flat condition. The tire 12 is of conventional design and may be either a bias ply or radial type. The tire 12 includes a circular, circumferential tread part 18, opposed sidewalls 20 and 22 integrally formed with the tread part 18 and delimited by radially inwardly disposed circumferential bead portions 24 and 26, respectively.

The wheel 14 is also of substantially conventional construction and includes a central, circular disk hub portion 28 adapted to be mounted on a conventional vehicle rotatable wheel hub, not shown. A circumferential circular rim 30 of wheel 14 includes opposed generally laterally extending webs 32 and 34 opposite sides of the hub 28 and each being delimited by radially outwardly disposed circumferential tire bead flanges 33 and 35, respectively. The flanges 33 and 35 include curved surfaces 33a and 35a configured to be in sealing and supportive engagement with the tire bead portions 24 and 26, respectively, to prevent loss of pressure gas from the inflation chamber 16. A conventional inflation and deflation valve stem 38 is shown projecting through the rim web portion 32 at a suitable location thereon.

Those skilled in the art will recognize that the center rim 30 may take different cross-sectional configurations. However, typically the rim 30, including the web portions 32 and 34 is of a smaller diameter, with respect to the wheel central axis of rotation 31, FIG. 2, than the flanges 33 and 35 and, particularly, the outermost edge 33b of the flange 33 and 35b of the flange 35. The tire 12 may be mounted on the wheel 14 in a conventional manner. Although the wheel 14 is shown having integral hub and rim portions 28 and 30, those skilled in the art will recognize that the present invention may be used in conjunction with fixed multiple-piece welded or riveted rims or separable wheel rims of various designs. However, the run-flat support device of the invention is particularly advantageous in that it may be mounted on fixed or integral rims wherein the bead flanges 33 and 35 may not be separated from each other or from the rim 30.

Figure 3:
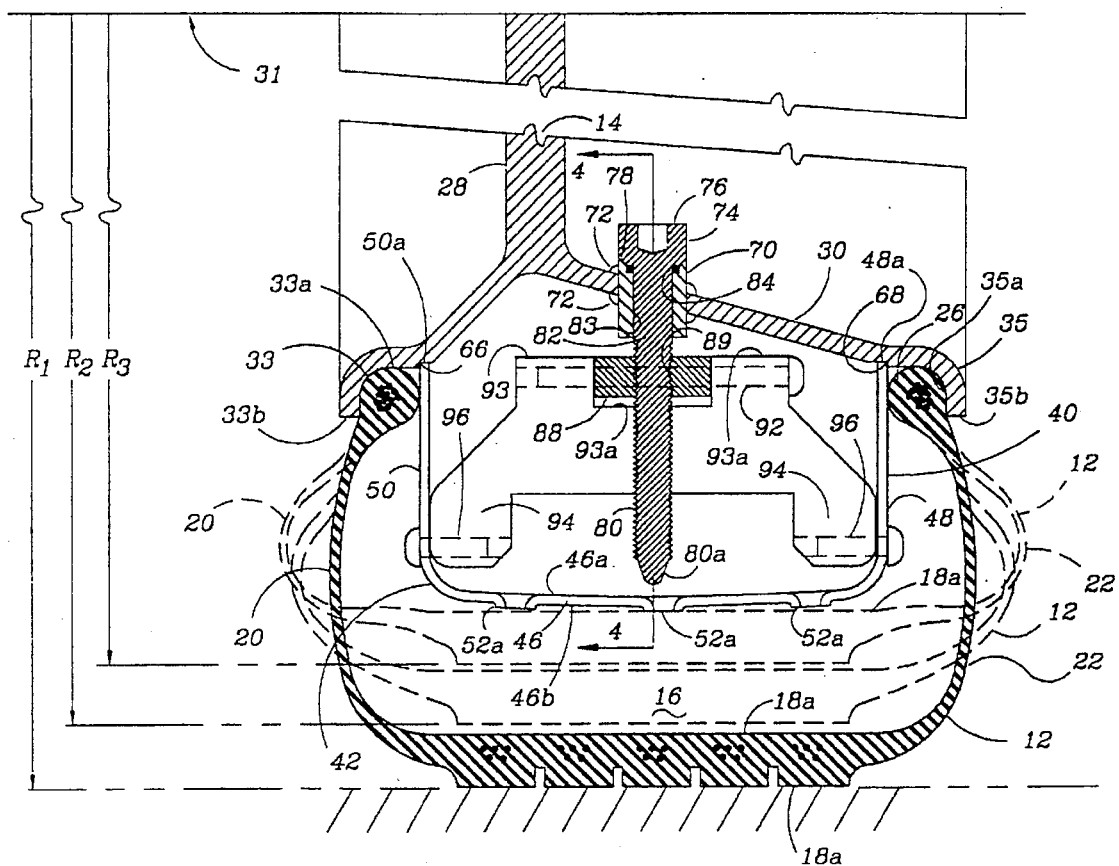
FIG. 3 is a section view on a larger scale taken generally from the line 3—3 of FIG. 1.
Figure 5:
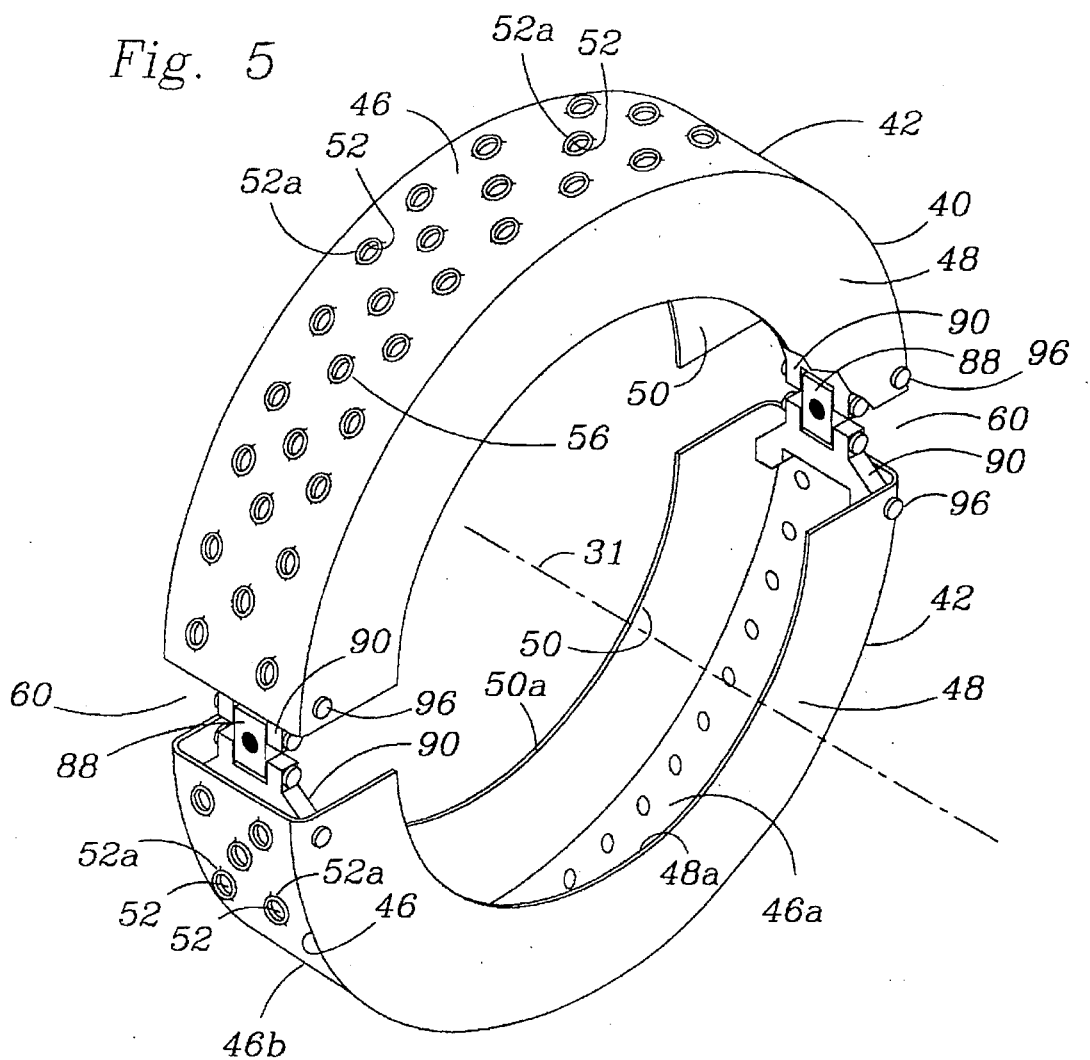
FIG. 5 is a perspective view of the support device in its radially extended condition before mounting on a wheel rim over the tire bead flanges.

Referring further to FIGS. 1 through 3, and also FIG. 5, the tire support device of the invention is illustrated and generally designated by the numeral 40. The support device 40 includes opposed, interconnected, substantially semi-circular segment support members 42 of identical construction. The members 42 are characterized by substantially semi-cylindrical tire support surfaces formed by web portions 46 and opposed radially inwardly extending generally parallel flanges 48 and 50. The members 42 may be formed of a suitable engineering material such as steel, aluminum or a high strength reinforced plastic. The web portions 46 are also formed to have at least a slight radially outward convex curvature or crown between the flanges 48 and 50 to aid in causing the tire tread 18 to remain centered on the support device 40 during engagement therewith. The web portions 46 are also preferably provided with gripping means for engagement with the tread inner wall 18a of the tire 12, which gripping means are characterized by a plurality of circular openings 52 arranged in three spaced apart circumferential rows 54, 56 and 58 on each of the members 42. The openings 52 may be formed by die-punching the web portion 46 from its inner wall surface 46a, see FIG. 3, to form an annular projection 52a on the outer wall surface 46b. Other means for providing a gripping surface on the exterior of the support members 42 may be provided as will be appreciated by those skilled in the art.

Referring further to FIGS. 1, 2 and 5, the opposed support members 42 are interconnected by a unique linkage to permit the support members to be moved with respect to each other and with respect to the central axis 31 between a radially extended position for mounting the support device 40 on the wheel 14 and a radially retracted position of the support device in forcible engagement with the rim web 30. Each linkage is generally designated by the numeral 60 in FIGS. 1, 2 and 5. As described above, the linkages 60 provide for radial extension and contraction of the segment support members 42 with respect to each other and the axis 31 so that the support device 40 may be mounted on a wheel, such as the wheel 14, where the wheel rim 30 is of a smaller diameter than the bead flanges 33 and 35, for example. However, the support device 40 may be used in conjunction with multiple-part wheels or wheels which have a rim portion with a diameter about the same as or even greater than the tire bead flanges.

FIG. 2 shows the support device 40 disposed on the wheel 14 and in a working position wherein the tire 12 has been deflated and the portion of the tire tread 18 in contact with a roadway 19 has forced the tread inner wall 18a into forcible engagement with the support device 40 along the web 46 of the support members 42, as the wheel rotates.

Figure 4:
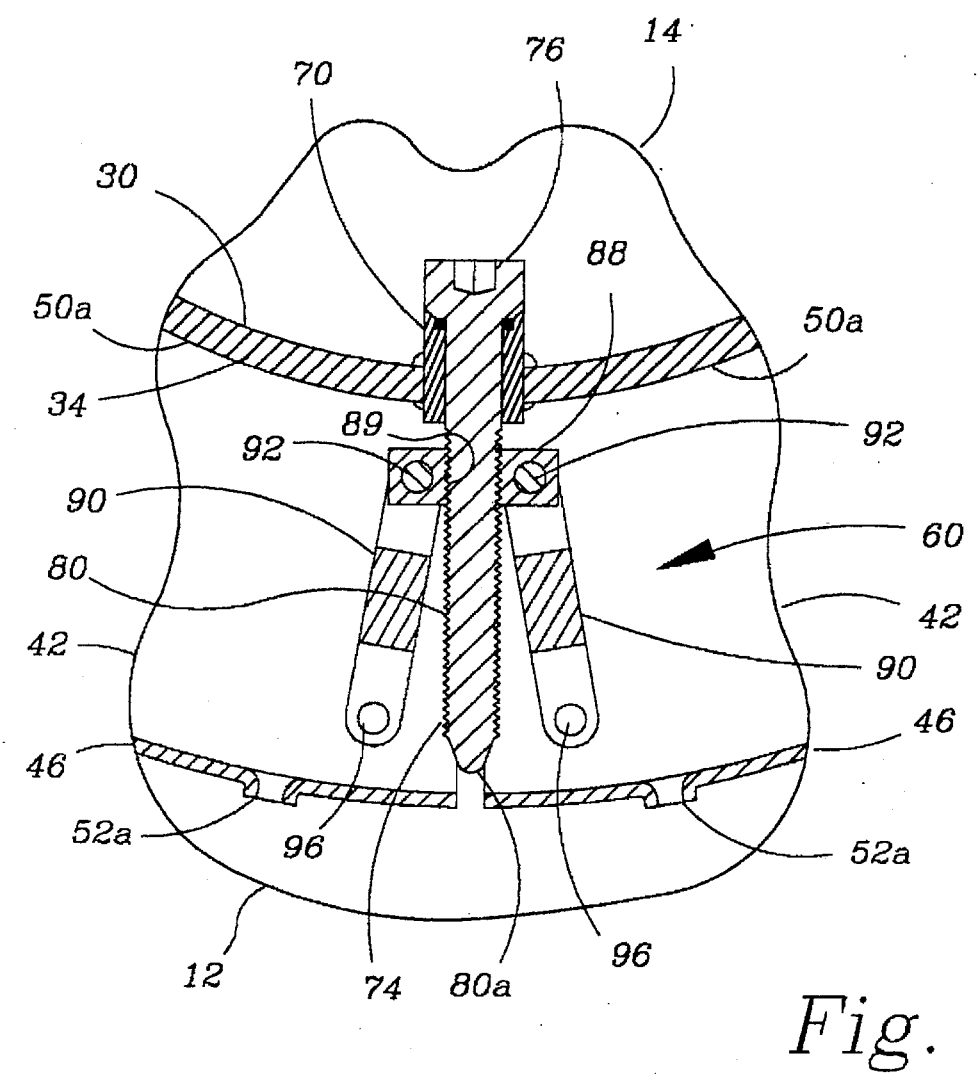
FIG. 4 is a detail section view taken from the line 4—4 of FIG. 3.

Referring now to FIGS. 3 and 4, further details of the support device 40 are shown and will be described herein. FIG. 3 shows the cross-sectional profile of the tire 12 when it is under normal inflation pressure and without any load on the tire such as imposed by at least a portion of the weight of a vehicle supported by the wheel 14. Accordingly, in the inflated condition of the tire 12 on the wheel 14 and without any load weight applied thereto the tire assumes a radius $R_1$ with respect to the axis 31. When the tire 12 is under a normal vehicle weightload, it assumes the position wherein the sidewalls deflect some and the tread 18 assumes a position at a radius $R_2$ with respect to the axis 31. Finally, when the tire 12 is substantially deflated, the sidewalls 20 and 22 may deflect to the position wherein the tread is at a radius $R_3$ with respect to the axis 31.

In FIG. 3 it is also shown how the gripping means 52 engage the inner wall 18a of the tire tread to prevent lateral or circumferential slippage of the tread with respect to the support device 40 under either lateral forces exerted on the wheel 14 or tractive effort exerted by rotation of the wheel 14.

FIG. 3 further illustrates the preferred lateral extent of the web 46 and the position of the radially inwardly extending flanges 48 and 50 with respect to the opposed tire beads 24 and 26. FIG. 3 also illustrates how the rim 30 may be provided with circumferential opposed recesses 66 and 68 for engagement with the flanges 50 and 48, respectively, to further support the device 40 against lateral movement with respect to the rim 30. The recesses 66 and 68 may be machined in the rim 30 at the time of manufacture of the wheel 14 or during retrofit of the device 40 to the wheel 14 after manufacture. The recesses 66 and 68 may be omitted, depending on the cross-sectional geometry of the rim 30, and, in any case, other means to be described herein for securing the device 40 to the wheel 14 may be sufficient to prevent any lateral movement of the device 40 in the direction of the axis 31, for example.

The wheel 14 is further modified to receive the support device 40 by the installation of plural support bushings 70 projecting radially through the rim 30 on the web portion 34, for example, as shown. A suitable radial hole may be bored in the web 34 and the bushing 70 welded in place by suitable airtight welds 72 on the both the inner and outer surfaces of the web 34, as shown. The bushing 70 is preferably centered between the flanges 33 and 35 and is adapted to form a support for an elongated threaded bolt 74 having a socket head portion 76 with a beveled edge 78, a threaded shank portion 80 and a distal pilot shank portion 80a. A non-threaded cylindrical shank portion 82 extends between the head 76 and the threaded shank portion 80.

The non-threaded shank portion 82 is adapted to be a close sliding fit in a bore 83 formed in the bushing 70. A suitable elastomeric seal ring 84 may be supported on the bushing 70 for engagement with the beveled edge 78 of the head 76 to prevent leakage of pressure gas from the space 16 through the bushing. As shown in FIG. 1 two diametrically opposed bolts 74 and support bushings 70 are provided in wheel 14 having a support device 40 with opposed linkages 60 for expanding and contracting the members 42.

Referring further to FIGS. 3 and 4, each linkage 60, one shown, is characterized by a first link member 88 which is provided with a suitable internal threaded bore 89 for engaging the threaded shankportion 80 of the bolt 74. The link member 88 is pivotally connected adjacent its opposite ends to opposed spaced apart links 90 by suitable pivot pins 92 whereby the links 90 may pivot with respect to the link member 88 as the bolt 74 is rotated in one direction or the other. The links 90 each include opposed spaced apart pivot pin support portions 93 providing an intermediate recess 93a to permit pivotal movement relative to link member 88. The links 90 also include spaced apart arm portions 94, see FIG. 3, which are adapted to be connected to the flanges 48 and 50, respectively, of each support member 42 by respective opposed pivot pins 96 extending parallel to and spaced from pivot pins 92.

Figure 6:
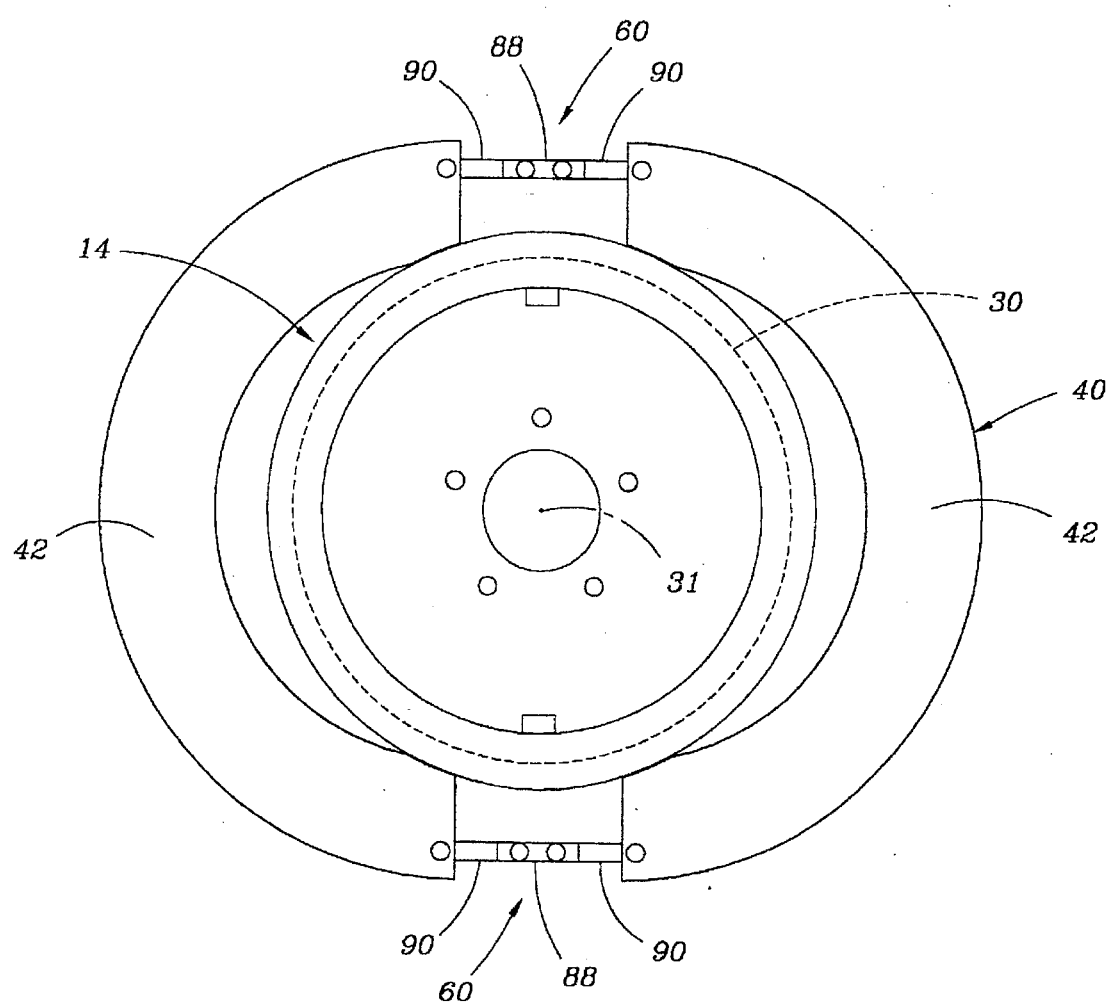
FIG. 6 is an elevation view of the support device showing the support member segments in their radially extended position with a wheel disposed therebetween.

The pins 96 are supported by the flanges 50 and 48, respectively, of each of the members 42. The pins 92 and 96 may include suitable threaded portions, not shown, or be interference fitted in cooperating bores in the links 90 for securing the pins to the links 90. When the bolt 74 is rotated to draw the link member 88 toward the head 76 of the bolt the links 90 will pivot with respect to the member 88 to draw the opposed support members 42 toward each other and into forcible engagement with the rim 30 of the wheel 14. Conversely, if the bolt 74 is rotated in the opposite direction the link member 88 will move away from the head 76 causing the links 90 to pivot in opposite directions, viewing FIG. 4, to force the members 42 away from each other. FIGS. 5 and 6 show the linkages 60 holding the members 42 spaced apart from each other the maximum distance permitted by the linkages.

By providing for radial extension and contraction or retraction of the circular segment support members 42 with respect to each other the support device 40 may be slipped onto a wheel 14 over the bead flanges 33 or 35. The linkages 60 are then positioned in alignment with the bushings 70 and the bolts 74 are projected through the bushings and threadedly engaged with the link members 88 whereby, upon drawing the link members 88 toward the bushings 70 and the bolt heads 76, the members 42 are drawn radially toward each other, with respect to the axis 31, into forcible engagement with the rim 30, preferably at the recesses 66 and 68, if provided, to secure the support device 40 on the wheel 14. The bolt pilot shank portions 80a facilitate locating the threaded bores formed in the link members 88 during assembly of the support device 40 to the wheel 14.

Those skilled in the art will appreciate that the support device 40 may be advantageously retrofitted to existing one-piece or fixed multi-part wheels having opposed bead flanges and center rim portions arranged such that the rim portion has an effective outer diameter less than the diameter of the bead flanges, thereby precluding assembly of a one-piece as well as prior art multi-piece run-flat support devices to a so-called fixed or one-piece wheel. However, the support device 40 may also be mounted on separable multi-part wheels if desired.

Fitting the support device 40 to a wheel may be carried out by demounting a tire from the wheel, if required, and preferably machining the recesses 66 and 68 for receiving the radially inner edges 50a and 48a of the flanges 50 and Opposed holes are drilled or otherwise formed in the rim web 34 to receive the bushings 70 and the bushings are welded in place in the positions shown in FIGS. 3 and 4 for receiving the bolts 74. The support device 40 may then be easily mounted on the wheel rim 30 by first placing the support device in the position of the respective support members 42, as shown in FIGS. 5 and 6, and sliding the support device laterally over the flange 33 or 35 of the wheel 14, then moving the linkages 60 at least slightly radially inwardly and positioning the link members 88 so that the bolts 74 may be threadedly engaged therewith upon sliding the bolts through the bushings 70. Upon tightening the bolts 74, the members 42 are brought into forcible engagement with the rim 30.

Figure 7:
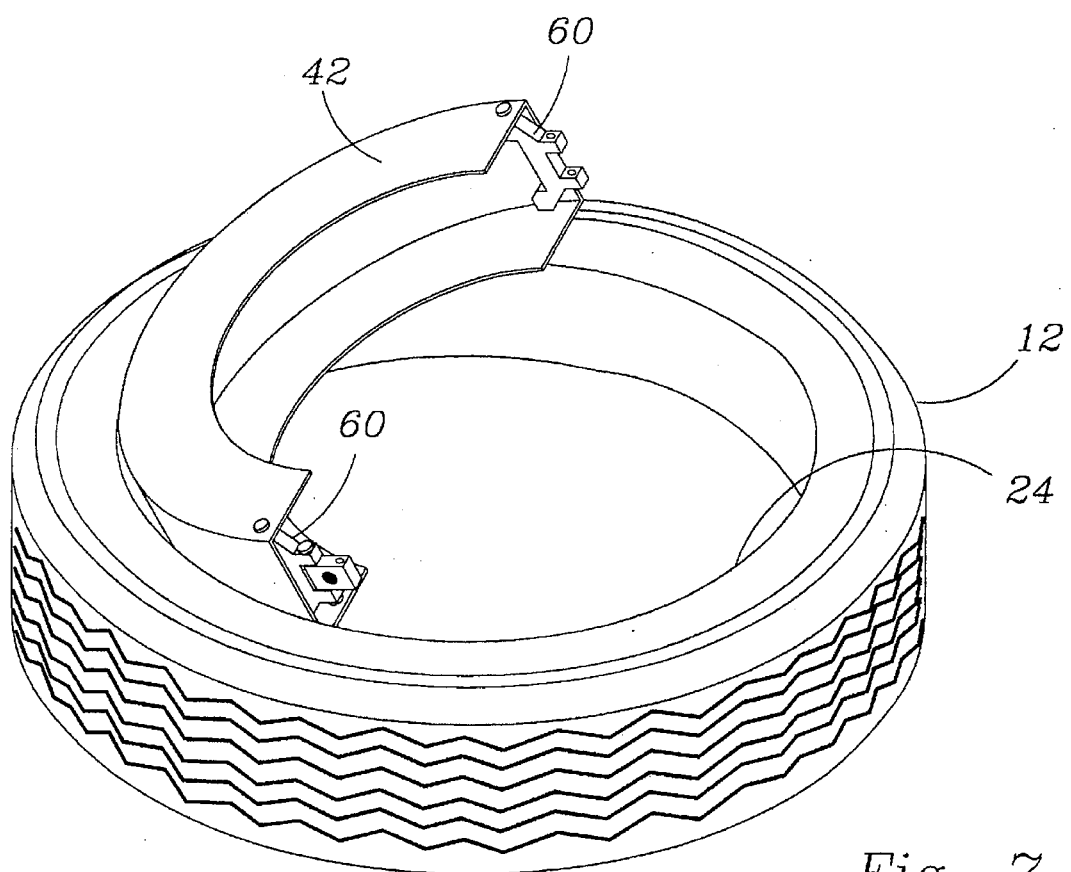
FIG. 7 is a perspective view showing the support device being inserted within a tire partially disposed on a wheel.

An important advantage of the support device 40 resides in the configuration of the device wherein, with a wheel and tire arrangement such as that described above and shown in FIGS. 1 through 6, the tire does not have to be demounted completely from the wheel 14 in order to mount the support device 40 on the wheel. FIG. 7 illustrates the support device 40 being mounted on a wheel 14 wherein the tire 12 has been partially demounted from the wheel by moving the bead 24 from between the flanges 33 and 35 while the bead 26 remains between these flanges. With one of the tire beads mounted on the wheel 14 and the other not yet slipped over the bead flange, a sufficient amount of room is provided between the wheel 14 and the tire 12 to permit mounting the support device 40 on the wheel before the other tire bead is forced into engagement with the bead support and seal surfaces formed by the flange 33 or 35.

After positioning the support device 40 as described above, with respect to the wheel 14 and securing the support device to the wheel, the tire 12 may be fully mounted on the wheel by forcing the bead 24 over the flange 33 so that it is disposed between the flanges 33 and 35. The beads 24 and 26 are then brought into registration with the bead surfaces 33a and 35a, respectively, and the tire is inflated in a conventional manner. The wheel assembly 10 is then ready to be mounted on a vehicle for normal use. Thanks to the construction of the support device 40, including the gripping means provided by the openings 52 and the outwardly facing projections 52a formed thereby the tire 12 may operated in a run-flat condition for an extended period of time. The support device 40 does not add a substantial amount of weight to the wheel assembly and may be constructed of conventional engineering materials as mentioned above.

Figure 8:
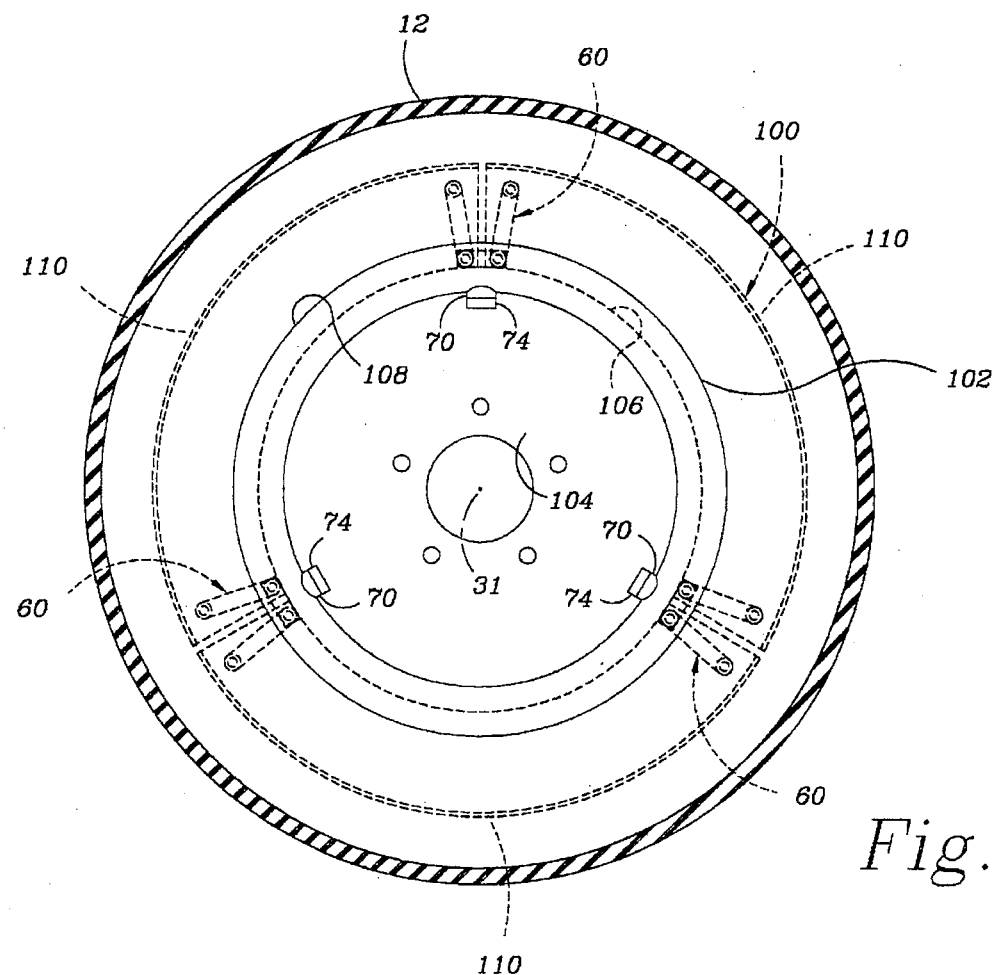
FIG. 8 is a side elevation view of an alternate embodiment of the run-flat support device of the present invention.

Referring now to FIG. 8, an alternate embodiment of a run-flat support device 100 is shown mounted on a wheel 102 having a hub portion 104 and a circular rim 106. The wheel 102 is of substantially the same configuration as the wheel 14 and is adapted to support a pneumatic tire 12 in the same manner as the wheel 14. However, the radial distance between the rim 106 and opposed bead flanges 108, one shown, may be such that a support device having only two circular segment support members may not be capable of radial expansion sufficient to slip the support device over the bead flanges and then be capable of radial retraction into forcible engagement with the rim 106. Consequently, the run-flat support device 100 is made up of three circular segment, support members 110, each interconnected by linkages 60 in the, same manner as the support device 40. Three equally spaced bolts 74 project through the rim 106 in engagement with the linkages 60 in the same manner as described above for the support device 40 to effect radial expansion and contraction of the ring members 110 with respect to the wheel 102. The support device 100 is otherwise constructed substantially in the same manner and using the same materials as the support device 40.

Although preferred embodiments of the invention have been described in detail herein, those skilled in the art will recognize that various substitutions and modifications may be made to the support devices 40 and 100 and equivalents thereof without departing from the scope and spirit of the invention as recited in the appended claims.

What is claimed is:

1. A device for supporting a pneumatic tire on a wheel in an under-inflated, deflated or run-flat condition, said support device comprising:

a plurality of support members adapted to be supported on a wheel in engagement therewith, each support member having a peripheral support surface for engagement with an inner wall of a pneumatic tire during run-flat operation;

linkage means interconnecting said support members for movement with respect to each other; and, means attachable to the wheel and coupled to said linkage means for moving the support members from a first position in which the support members are separated from the wheel to a second position in which the support members are disposed in engagement with the wheel.

2. The support device set forth in claim 1 wherein:

each of said support members includes a transverse web and radially inwardly extending, spaced apart flanges connected to said web, said support surface being formed on said web.

3. The support device set forth in claim 2 wherein:

said web has a convex support surface extending between said flanges to aid in centering a tire on said support device during engagement therewith.

4. The support device set forth in claim 2 including:

grip means formed on said web for engagement with an inner wall of a tire to minimize sliding motion between said inner wall and said support device.

5. The support device set forth in claim 1 wherein:

said moving means comprising a threaded bolt; and, said linkage means comprises a first link member threadedly engaged with said threaded bolt, said bolt being supported on said wheel and rotatable relative to said wheel, and opposed link members connected, respectively, to adjacent ones of said support members and to said first link member and responsive to movement of said first link member along said threaded bolt to cause said support members to move between a radially extended position for mounting said support device on said wheel and a radially retracted position to cause said support members to forcibly engage said wheel.

6. The support device set forth in claim 1 wherein:

said support members comprise at least two opposed, generally semi-circular segments interconnected by opposed linkage means for moving said segments radially with respect to a central axis between extended and retracted positions.

7. The support device set forth in claim 1 wherein:

said support members comprise three substantially semi-circular segments, each of said segments being interconnected to the other two of said segments by opposed linkage means operable to move said segments between radially extended and retracted positions of said segments with respect to each other.

8. A support device for a pneumatic tired wheel for supporting a pneumatic tire in a deflated, run-flat condition, said wheel including spaced apart tire bead engaging flanges and a center rim portion disposed between said flanges and said tire including opposed generally circular beads engageable with support surfaces formed by said flanges, said support device being adapted to be mounted on said wheel without demounting said tire completely from said wheel, said support device comprising:

a plurality of support members interconnected by means for moving said support members relative to each other to a radially extended position with respect to a central axis of said wheel to provide for mounting said support device on said wheel by moving said support device over one of said flanges and into a position generally adjacent to and substantially surrounding said center rim portion, said means for moving said support members being operable to move said support members into forcible engagement with said center rim portion of said wheel for supporting said tire in a run-flat condition;

the support members including substantially semi-circular segments and the means interconnecting the support members including a linkage for permitting the segments to move to a radially extended position for positioning the support device over one of the wheel flanges and adjacent to the center rim portion and to a radially retracted position in which the support members are disposed in engagement with the center rim portion; and, a threaded bolt disposed on said wheel and being coupled to the linkage for effecting movement of the support members to the radially extended position and to the radially retracted position.

9. The support device set forth in claim 8 wherein:

said support members each comprise a generally channel-shaped member having a web with a curved outer support surface and opposed radially inwardly projecting flanges connected to said web, said flanges having inner edge portions engageable with said center rim portion for supporting said support members on said wheel.

10. The support device set forth in claim 9 wherein:

said means for moving said support members comprises a first intermediate link member and opposed link members connected, respectively, to adjacent ones of said support members and to said intermediate link member, said intermediate link member being engageable with the threaded bolt for effecting movement of said intermediate link member to cause said opposed link members to move said support members between radially extended positions for mounting said support device on said wheel and radially retracted positions to cause said support members to forcibly engage said center rim portion.

11. The support device set forth in claim 9 wherein:

said web has a convex surface extending between said flanges for centering a tire on said support device during run-flat operation.

12. The support device set forth in claim 9 wherein:

said support device includes grip means formed on said web for engagement with an inner wall of a tire to enhance gripping engagement between said support device and said tire during run-flat operation.

13. A support device for supporting a pneumatic tire in a run-flat condition on a wheel of the type including opposed circular tire bead support flanges, a center rim interposed between said flanges and threaded bolts projecting through said center rim at circumferentially spaced apart points, respectively, said support device comprising:

a plurality of semi-circular segment support members, collectively forming a substantially continuous circumferential support surface for said tire during run-flat operation; and linkages interconnecting said support members, respectively to each other, said linkages each including a first intermediate link member and opposed link members pivotally connected to said support members and to said intermediate link member, said intermediate link members each including a threaded bore for receiving one of said bolts, respectively, whereby, in response to rotation of said bolts in engagement with said intermediate link members said linkages are operable to move said support members to a radially retracted position in forcible engagement with said center rim for supporting said tire during run-flat operation.

\* \* \* \* \*